US009251216B2

(12) United States Patent
Cormode et al.

(10) Patent No.: US 9,251,216 B2
(45) Date of Patent: Feb. 2, 2016

(54) EFFICIENT PUBLICATION OF SPARSE DATA

(75) Inventors: Graham Cormode, Morristown, NJ (US); Cecilia Procopiuc, Summit, NJ (US); Divesh Srivastava, Summit, NJ (US); Thanh Tran, Amherst, MA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 754 days.

(21) Appl. No.: 13/111,154

(22) Filed: May 19, 2011

(65) Prior Publication Data
US 2012/0296898 A1    Nov. 22, 2012

(51) Int. Cl.
*G06F 17/30* (2006.01)
*G06F 21/62* (2013.01)

(52) U.S. Cl.
CPC ...... *G06F 17/30522* (2013.01); *G06F 21/6254* (2013.01)

(58) Field of Classification Search
CPC ........................................................ G06F 17/30
USPC ................................................. 707/600–899
See application file for complete search history.

(56) References Cited

U.S. PATENT DOCUMENTS

| 8,015,117 | B1 * | 9/2011 | Lillibridge et al. | 705/74 |
| 2009/0303237 | A1 * | 12/2009 | Liu et al. | 345/440 |
| 2011/0208763 | A1 * | 8/2011 | McSherry et al. | 707/757 |
| 2011/0283099 | A1 * | 11/2011 | Nath et al. | 713/150 |

OTHER PUBLICATIONS

Cormode et al., "Differentially Private Publication of Sparse Data"; AT&T Labs Research; Mar. 4, 2011.

* cited by examiner

*Primary Examiner* — Isaac M Woo
(74) *Attorney, Agent, or Firm* — Hartman & Citrin LLC

(57) ABSTRACT

The present disclosure is directed to systems, methods, and computer-readable storage media for publishing data. A data summary summarizing the data can be generated and published according to several publishing schemes. In some embodiments, non-zero entries are selected and modified and zero entries are sampled according to one or more distribution functions. The sampled and modified values are added to a data summary, or a sample of the sampled and modified values are added to the data summary. The data summary is published, released, used, or otherwise output. In other embodiments, priority values are assigned to each value associated with the data, and a number of entries with the highest values are selected and added to the data summary.

20 Claims, 6 Drawing Sheets

EFFICIENT PUBLICATION OF SPARSE DATA

BACKGROUND

This application relates generally to publishing data. More specifically, the disclosure provided herein relates to efficient publication of sparse data.

Many entities maintain or use data that includes sensitive information about clients, customers, users, and the like. These data can be valuable to the entities, for example, the data can be analyzed to determine usage patterns or trends, to identify and/or define audiences and potential audiences, to identify business development or improvement opportunities, and/or for other purposes. These data also can be valuable to the entities as a product that can be sold, leased, and/or otherwise shared with other entities for their own analysis, storage, and/or use.

One problem with using, storing, selling, or otherwise releasing these data is that the data often includes sensitive information. For example, entities sometimes store detailed demographic information about customers such as income information, shopping and purchasing histories, and the like. The data and associated sensitive information can include enough detail that third parties are able to apply analysis and data mining techniques to determine identities of one or more customers and their associated demographic information. As such, privacy of customers can be compromised by releasing data.

To address these and other concerns, various laws and regulations have been crafted to govern how data can be published or used without compromising privacy or security of customers or other entities. Various methods are used to release the data in accordance with these laws and regulations, many of which require extensive consumption of resources. For example, some anonymization schemes used to enforce privacy on released data include adding noise to the values of the released data, a process that requires modification of a large number of values associated with the data. For small data sets, these schemes are reasonable, but for large data sets these schemes can become unduly burdensome for the data owner and can make use or sharing of the data impracticable.

Furthermore, another challenge is faced when releasing or using sets or collections of sparse data, i.e., data or data sets having a large proportion, a majority, and/or a vast majority of zero-valued entries. For example, a data set of ten million commuters living and working across one million locations can result in a contingency table having 1,000,000,000,000 entries, the vast majority of which will have values of "0." Simply storing this data set would consume an enormous amount of computing and/or storage resources, while adding noise to each entry or cell in this hypothetical contingency table would consume a dramatically greater amount of computing and storage resources, making such an approach for protecting privacy unwieldy or even unmanageable.

SUMMARY

The present disclosure is directed to publication of data. In some embodiments, the data is sparse data that is efficiently published. According to various embodiments disclosed herein, the sparse data is published while maintaining differential privacy. In addition to the generally known definition of differential privacy, the phrase "differential privacy," as used herein with respect to published data, refers to data that is published in accordance with a privacy approach that maximizes accuracy of data and/or queries against the data while minimizing the chances that one can identify one or more records associated with the data. For example, published data complies with, or achieves, differential privacy if the probability of output falling in some set is at most $\exp(\epsilon)$ times the probability of the output falling in the same set, given input that differs in the records of at most one individual.

"Sparse data," as used herein and in the claims, refers to data and/or data sets having a large proportion, a majority, and/or a proportion exceeding a majority, of entries having values "0." As used herein, "publishing" data includes, but is not limited to, outputting the data, publishing data or data sets, releasing data or data sets, sharing data or data sets, anonymizing and/or summarizing data or data sets, formatting data or data sets in an analyzable format, combinations thereof, and the like. In some embodiments, sparse data includes a vast majority of zero-valued entries.

According to various embodiments disclosed herein, data is obtained. The data is obtained, in various implementations, by a summarization engine. A summary of the data ("data summary") is generated using one or more summarization and/or anonymization schemes. In some embodiments, non-zero entries are selected and modified and zero entries are sampled according to one or more distribution functions. The sampled and modified values are added to a data summary, or a sample of the sampled and modified values are added to the data summary. The data summary is published, released, used, or otherwise output.

According to an aspect, a computer-implemented method for publishing data includes obtaining data at a summarization engine. The data obtained at the summarization engine can include two or more entries. The method also includes modifying one of the two or more of entries to obtain a resulting value, determining if the resulting value satisfies a threshold, and adding the resulting value to a data summary in response to determining that the resulting value satisfies the threshold. The method also includes publishing the data summary.

In some embodiments, the one of the two or more entries includes one of the two or more entries that has a non-zero value. The method also can include sampling one or more zero-valued entries from the two or more entries. Sampling the zero-valued entries can include sampling a number of zero-valued entries. In some embodiments, the number of entries is determined according to a statistical distribution. For example, in some embodiments, the number of entries is determined according to a binomial distribution. The sampled zero-valued entries are added to the data summary and are associated with a noise value drawn from a statistical distribution. The method also can include adding the zero-valued entry to the data summary.

In some embodiments, modifying the one of the two or more entries includes adding noise to the one of the two or more entries. Modifying the one of the two or more entries also can include adding geometric noise to the one of the two or more entries. In some implementations, the method further includes not adding the resulting value to the data summary in response to determining that the resulting value does not satisfy the threshold. The method also can include determining if the two or more entries includes a further non-zero entry, and selecting the further non-zero entry in response to determining that the two or more entries includes the further non-zero entry. The data summary can include a data summary that is differentially private. In some embodiments, modifying the one of the two or more entries includes modifying each non-zero valued entry of the two or more entries to obtain two or more resulting values. Adding the resulting value to the data summary includes, in some instances, adding each of the two or more resulting values that satisfies the threshold to the data summary.

According to another aspect, a computer-implemented method for publishing data includes obtaining data at a summarization engine, the data including two or more entries, and modifying one of the two or more entries to obtain a resulting value. The one of the two or more values includes a non-zero valued entry. The method also includes adding the resulting value to a data summary, sampling a number of zero-valued entries from the two or more entries, adding the number of zero-valued entries to the data summary, and publishing the data summary.

In some embodiments, sampling the number of zero-valued entries includes determining the number of zero-valued entries according to a statistical distribution such as a binomial distribution and sampling the determined number of zero-valued entries. Modifying the one of the two or more entries can include adding noise to the one of the two or more entries. In some instances, the value of the noise added to the one of the two or more entries is zero and in some instances the value of the noise is a value other than zero. Modifying the one of the two or more entries also can include sampling the non-zero valued entry and adding the noise to the non-zero valued entry. In some embodiments, the data summary includes a data summary that is differentially private.

According to another aspect, a computer-implemented method for publishing data includes computer-implemented operations for obtaining data at a summarization engine, the data including two or more entries. The method also includes assigning a priority value to each of the two or more entries and drawing a sample from the two or more entries. The sample can include two or more sampled entries. The method also includes adding the two or more sampled entries to a data summary, and publishing the data summary.

In some embodiments, the method also includes identifying a sample size. A number of the two or more sampled entries can be equal to the sample size. Drawing the sample can include selecting the two or more entries by recursively removing from the two or more entries, and adding to the data summary, an entry having a highest value. The data summary includes, in some embodiments, a data summary that is differentially private.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

The following detailed description is directed to methods, systems, and computer-readable media for efficient publication of sparse data. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
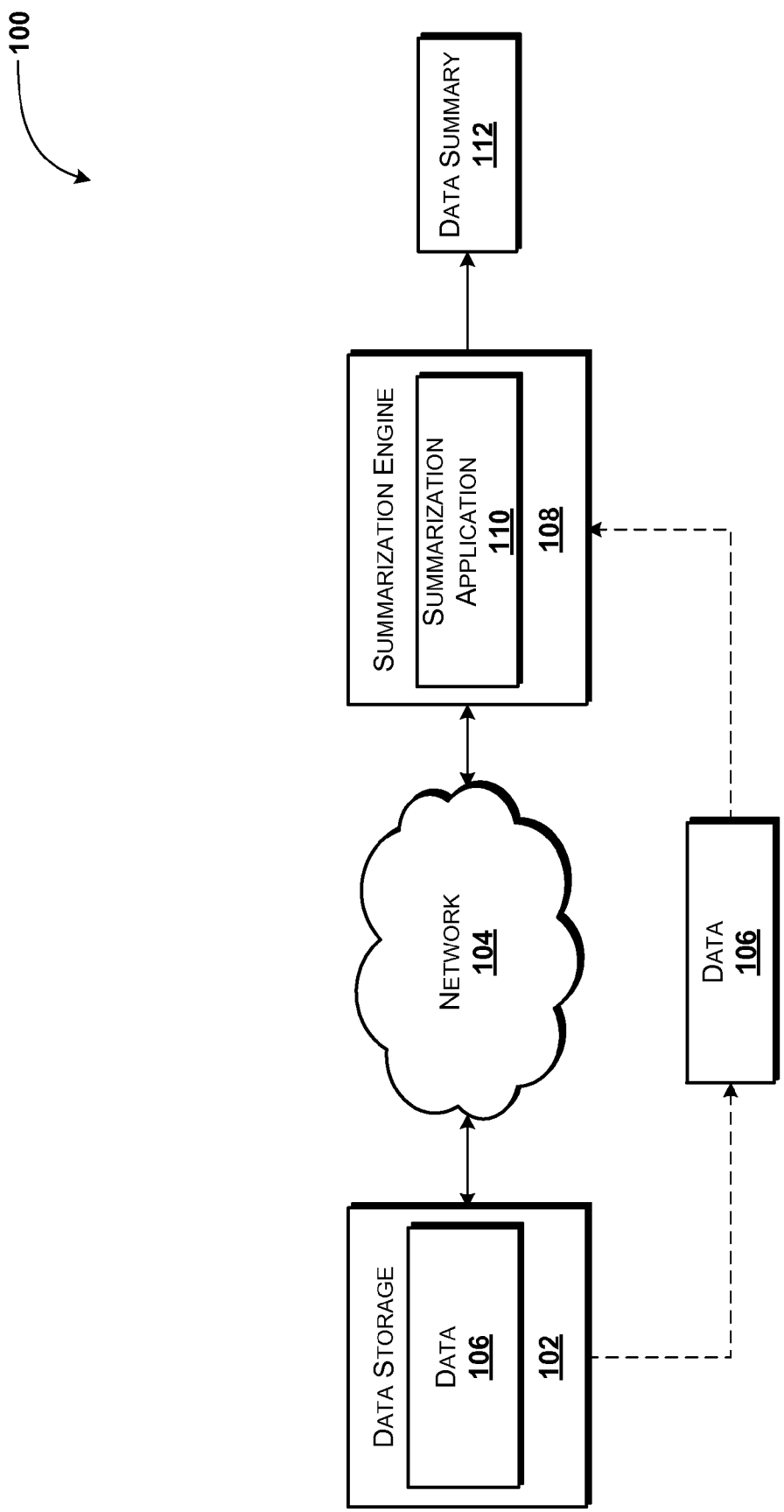
FIG. 1 is a system diagram illustrating an illustrative system for efficient publication of sparse data, according to various embodiments disclosed herein.

Referring now to FIG. 1, aspects of a system 100 for efficient publication of sparse data according to some illustrative embodiments presented herein will be described. The system 100 shown in FIG. 1 includes a data storage device 102. According to various embodiments, the functionality of the data storage device 102 described herein may be provided by one or more server computers, databases, datastores, computer readable media (as defined herein), desktop computers, mobile telephones, laptop computers, other computing systems, and the like. The data storage device 102 can be configured to operate on or in communication with a network 104. An illustrative network 104 is described in more detail below with reference to FIG. 5.

As illustrated in FIG. 1, the data storage device 102 stores or hosts one or more sets of data ("data") 106. The data 106 can be stored in almost any format including tables, contingency tables, matrices, text formats, tab- or other-character-delimited text formats, other formats, and the like. In some illustrative embodiments, the data 106 is stored in a database or data table. The data 106 can include any type of data that may be useful for analysis or otherwise may be sold to, shared with, or released to various entities. Furthermore, the data 106 described and illustrated herein corresponds to "sparse" data, as defined herein. In many instances, a large proportion, e.g., eighty to ninety percent or more of the values associated with the data 106 are equal to zero. In some embodiments, a vast majority, e.g., over ninety-five percent, of entries in the data 106 are zero. It should be understood that these embodiments are illustrative, and should not be construed as being limiting in any way.

The data storage device 102 also can be configured to communicate with a summarization engine 108 via the network 104 and/or via a direct link. The summarization engine 108 is configured to execute an operating system (not illustrated) and one or more application programs such as, for example, a summarization application 110, and/or other application programs. The operating system is a computer program for controlling the operation of the summarization engine 108.

The summarization application 110 is an executable program configured to execute on top of the operating system to provide the functionality described herein for enabling differentially private publication of the data 106. According to various implementations of the concepts and technologies disclosed herein, the summarization application 110 is configured to obtain the data 106, to apply noise and summarization processes to the data 106 to generate a data summary 112, and to publish, release, share, and/or otherwise output the data summary 112.

In some embodiments, the summarization application 110 is configured to generate the data summary 112 without actually applying noise to each entry in the data 106 and/or without actually summarizing the data 106. As such, as explained herein in more detail, the summarization application 110 is configured in some embodiments to generate the data summary 112 from the data 106 using efficient processes for analyzing, selecting, adding noise to, sampling from, and/or summarizing the data 106. According to various implementations of the concepts and technologies disclosed herein, the data summary 112 represents an anonymized summary of the data 106. The data summary 112 can consume less data storage space than the data 106, can protect privacy of various entities associated with the data 106, and can maintain the usefulness of the data 106.

In some embodiments, the summarization application 110 generates the data summary 112 using a high-pass filter algorithm, as will be described in more detail herein, particularly with reference to FIG. 2. According to some embodiments of the high-pass filter algorithm, the summarization application 110 obtains the data 106 and selects a non-zero entry in the data 106. The summarization application 110 adds geometric noise to the selected non-zero entry to obtain a resulting value. The summarization application 110 determines if the resulting value satisfies a defined threshold. If the resulting value satisfies the defined threshold, the resulting value is added to the data summary 112. If the resulting value does not meet or exceed the defined threshold, the resulting value is not added to the data summary 112. The summarization engine 108 can repeat these operations for each non-zero entry in the data 106.

The summarization application 110 also is configured to add zero-valued entries to the data summary 112. According to some embodiments, the summarization application 110 samples a number k of values, wherein the number k is determined according to a statistical distribution. In some embodiments, the statistical distribution used to determine k is the binomial distribution $Bin(m-n, p_\theta)$, where $$p_\theta \triangleq \frac{\alpha^\theta}{1+\alpha}.$$

It should be understood that this embodiment is illustrative, and should not be construed as being limiting in any way.

As used herein, m represents the total number of values or entries in a set of data 106, also represented herein as M, n represents the number of non-zero values in m, $\theta$ is a threshold value determined or set by the summarization application 110, $\Delta$ represents a sensitivity parameter, and $\alpha$ is defined as a function of a differential privacy parameter $\epsilon$. Furthermore, according to various implementations, $\alpha$ is defined as $e^{-\epsilon/\Delta}$. It should be understood that these embodiments are illustrative, and should not be construed as being limiting in any way.

According to various implementations of the concepts and technologies disclosed herein, the data 106, also denoted herein as M, can be shared or released by a data owner. Prior to releasing M, however, the data owner may need to take steps to protect entities associated with the data 106. In some embodiments, noise is added to each value or entry in M, thereby obtaining a new data set having noise added to each value. This data set is denoted herein as M'. It should be noted that the noise added to each entry or value in M can be 0 or a non-zero value. The data set M' can be summarized by drawing a sample of values from M', thereby allowing data owners and data users to store and use a representation of the data set M (referred to herein also as data 106). This summarized version of the data set M' is denoted herein as M'' and/or the data summary 112.

According to various implementations of the concepts and technologies disclosed herein, the summarization application 110 generates the summarized version of the data M'', i.e., the data summary 112, without first generating the data set M'. In some embodiments, the summarization application 110 further is configured to randomly select k locations i from the data 106 such that $M(i)=0$. For each of the k locations i, the summarization application 110 includes i with value v in the data summary 112 where v is sampled according to the distribution $Pr[X \leq x]=(1-\alpha^{x-\theta+1})$.

In other embodiments, the summarization application 110 generates the data summary 112 using a threshold sampling algorithm, as will be described in more detail herein, particularly with reference to FIG. 3. According to some embodiments of the threshold sampling algorithm, the summarization application 110 obtains the data 106 and selects a non-zero entry in the data 106. The summarization application 110 adds geometric noise to the non-zero entry to obtain a resulting value and adds the resulting value to the data summary according to a defined distribution. According to some embodiments, the defined distribution is $$p_i = \min\left(\frac{|M'(i)|}{\tau}, 1\right),$$

where $\tau$ is a sampling parameter determined or defined by the summarization application 110. In some embodiments, the sampling parameter $\tau$ is greater than 0. The summarization engine 108 can repeat these operations for each non-zero entry in the data 106.

The summarization application 110 also is configured to add zero-valued entries to the data summary 112. According to some embodiments, the summarization application 110 samples a number k of values, wherein the number k is determined according to a statistical distribution. In some embodiments, the statistical distribution is the binomial distribution $Bin((m-n), p_\tau)$, where $$p_\tau \triangleq \frac{2\alpha(1-\alpha^\tau)}{\tau(1-\alpha^2)}.$$

It should be understood that this embodiment is illustrative, and should not be construed as being limiting in any way. The summarization application 110 further is configured to randomly select the k entries i from the data 106 such that $M(i)=0$. For each of the k entries, the summarization application 110 draws the summary value $M''(i)$ from the distribution $Pr[X \leq v]$ given by $$\tau \alpha^{-v} C_\tau (1-\alpha),$$
$$\text{if } v \leq -\tau,$$
$$C_\tau(-v\alpha^{-v} + (v+1)\alpha^{-v+1} - \alpha^{\tau+1}),$$

-continued $$\frac{1}{2} + \alpha\, C_\tau(1 - (v+1)\alpha^v + v\alpha^{v+1}),$$

if $0 \le v \le \tau$, and $$\frac{1}{2} + \alpha\, C_\tau(1 - \alpha^\tau - \tau\alpha^v(1-\alpha)),$$

if $v > \tau$, wherein $C_\tau$ is a constant that depends upon $\tau$ and $\alpha$. According to various embodiments, $C_\tau$ is defined as $$\frac{1}{2\alpha(1-\alpha^\tau)}.$$

It should be understood that this embodiment is illustrative, and should not be construed as being limiting in any way.

In yet other embodiments, including one illustrative embodiment illustrated in FIG. 4 below, the summarization application 110 generates the data summary 112 using a priority sampling scheme. According to some embodiments of the priority sampling scheme, the summarization application 110 obtains the data 106 and assigns a priority to each entry in the data 106, wherein the assigned priority is $$P_i = \frac{|M'(i)|}{r_i},$$

where $r_i$ is a random value chosen uniformly from the range (0,1). The summarization application 110 then draws a sample of size s by picking the items with the s largest priority values. In some embodiments, the summarization application 110 is configured to retain the (s+1)th largest priority value for estimation purposes.

FIG. 1 illustrates one data storage device 102, one network 104, and one summarization engine 108. It should be understood, however, that various implementations of the system 100 include multiple data storage devices 102, multiple networks 104, and multiple summarization engines 108. Therefore, the illustrated embodiment should be understood as being illustrative, and should not be construed as being limiting in any way.

Figure 2:
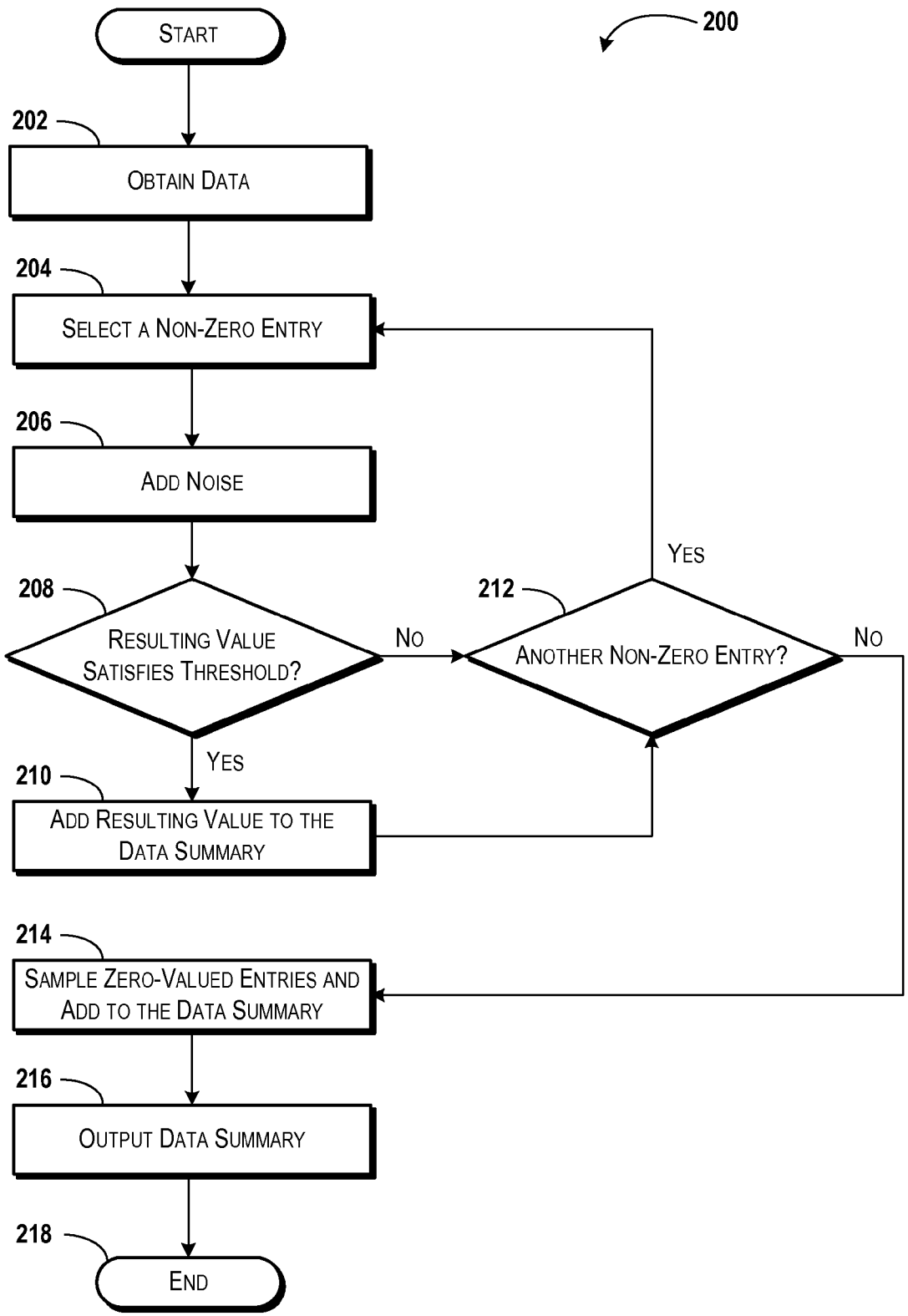
FIG. 2 is a flow diagram showing aspects of a method for efficient publication of sparse data, according to an illustrative embodiment.

Turning now to FIG. 2, aspects of a method 200 for efficient publication of sparse data will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof.

For purposes of illustrating and describing the concepts of the present disclosure, the method 200 is described as being performed by the summarization engine 108. It should be understood that the summarization engine 108, as well as additional and/or alternative devices and/or network nodes, can provide the functionality described herein via execution of one or more application programs including, but not limited to, the summarization application 110. Furthermore, it should be understood that the functionality of the summarization engine 108 can be provided by any number of devices or network nodes, and is not limited to the summarization engine 108 illustrated in the FIGURES. Thus, the illustrated embodiments are illustrative, and should not be viewed as being limiting in any way.

The method 200 begins at operation 202, wherein the summarization engine 108 obtains the data 106. As explained above with reference to FIG. 1, the summarization engine 108 can obtain the data 106 from the data storage device 102 in communication with the summarization engine 108 and/or from other data storage locations. In some embodiments, the data 106 is transmitted to the summarization engine 108, made available to the summarization engine 108, and/or otherwise provided to the summarization engine 108.

From operation 202, the method 200 proceeds to operation 204, wherein the summarization engine 108 selects a non-zero entry in the data 106. Although not illustrated in FIG. 2, it should be understood that the summarization engine 108 can be configured to analyze each entry in the data 106 and to identify the non-zero entries. Thus, operation 204 can include identifying the non-zero entries in the data 106 and/or selecting one or more of the non-zero entries.

From operation 204, the method 200 proceeds to operation 206, wherein the summarization engine 108 adds noise to the selected non-zero entry. As mentioned above, adding noise, also referred to herein and in the claims as modifying the selected value, can include adding a value of 0 to the selected value. Thus, someone observing the data with the noise added will be unaware of whether the value is the real value or the value with noise added. Thus, the operation 206 can include adding 0 to the selected non-zero entry. According to some embodiments, the summarization engine 108 adds geometric noise to the selected non-zero entry according to one or more noise functions and/or according to one or more random value generation functions. The non-zero entry with the added geometric noise is referred to herein as a "resulting value." It should be understood that the noise added to the selected non-zero entry can have a negative value, and as such the resulting value can be negative. According to various implementations, negative values are rounded up to the nearest meaningful number, i.e., "0." It should be understood that this embodiment is illustrative, and should not be construed as being limiting in any way.

From operation 206, the method 200 proceeds to operation 208, wherein the summarization engine 108 determines if the resulting value obtained in operation 206 satisfies a threshold. According to some embodiments, the threshold against which the resulting value is compared is selected based upon preferences, settings, values generated by one or more applied noise functions, combinations thereof, and the like. It can be appreciated that ideally the threshold is set such that "high" values are separated from "low values," i.e., such that a large portion of the data 106 does not pass the threshold comparison test, thereby shrinking the size of the data summary 112 relative to the size of the data 106. As such, the threshold value can be used to separate, via the determination in operation 208, the zero- or low-valued entries such as zero-valued entries having added noise values in the data 106, from the non-zero entries.

If the summarization engine 108 determines in operation 208 that the resulting value satisfies the defined threshold, the method 200 proceeds to operation 210. At operation 210, the summarization engine 108 adds the resulting value to the data summary 112. From operation 210, or from operation 208 if the summarization engine 108 determines that the resulting value does not satisfy the defined threshold, the method 200 proceeds to operation 212.

At operation 212, the summarization engine 108 determines if the data 106 includes another non-zero entry. If the summarization engine 108 determines, in operation 212, that the data 106 includes another non-zero entry, the method 200 returns to operation 204, wherein the summarization engine 108 selects another non-zero entry from the data 106. The operations 204-212 can be repeated until all non-zero entries in the data 106 have been processed by the summarization engine 108. If the summarization engine 108 determines, in operation 212, that another non-zero entry does not exist in the data 106, the method 200 proceeds to operation 214.

At operation 214, the summarization engine 108 samples the zero-valued entries in the data 106 and adds the sampled zero-valued entries to the data summary 112. From operation 214, the method 200 proceeds to operation 216, wherein the summarization engine 108 outputs the data summary 112. As noted above, the data summary 112 output by the summarization engine 108 can comply with the notion of differential privacy, but can be obtained without a two-step process of a) generating a contingency table; and b) sampling from the generated contingency table. Furthermore, as noted above, the word "output" as used herein with respect to outputting the data summary 112 includes, but is not limited to, releasing the data summary 112, selling the data summary 112, publishing the data summary 112, using the data summary 112, and/or otherwise making the data summary 112 available to one or more entities. As such, embodiments of the concepts and technologies disclosed herein allow generation of the data summary 112 directly from the data 106, thereby obviating the need to perform resource-intensive summarizing and sampling operations that otherwise would be performed on the data 106. From operation 216, the method 200 proceeds to operation 218. The method 200 ends at operation 218.

Figure 3:
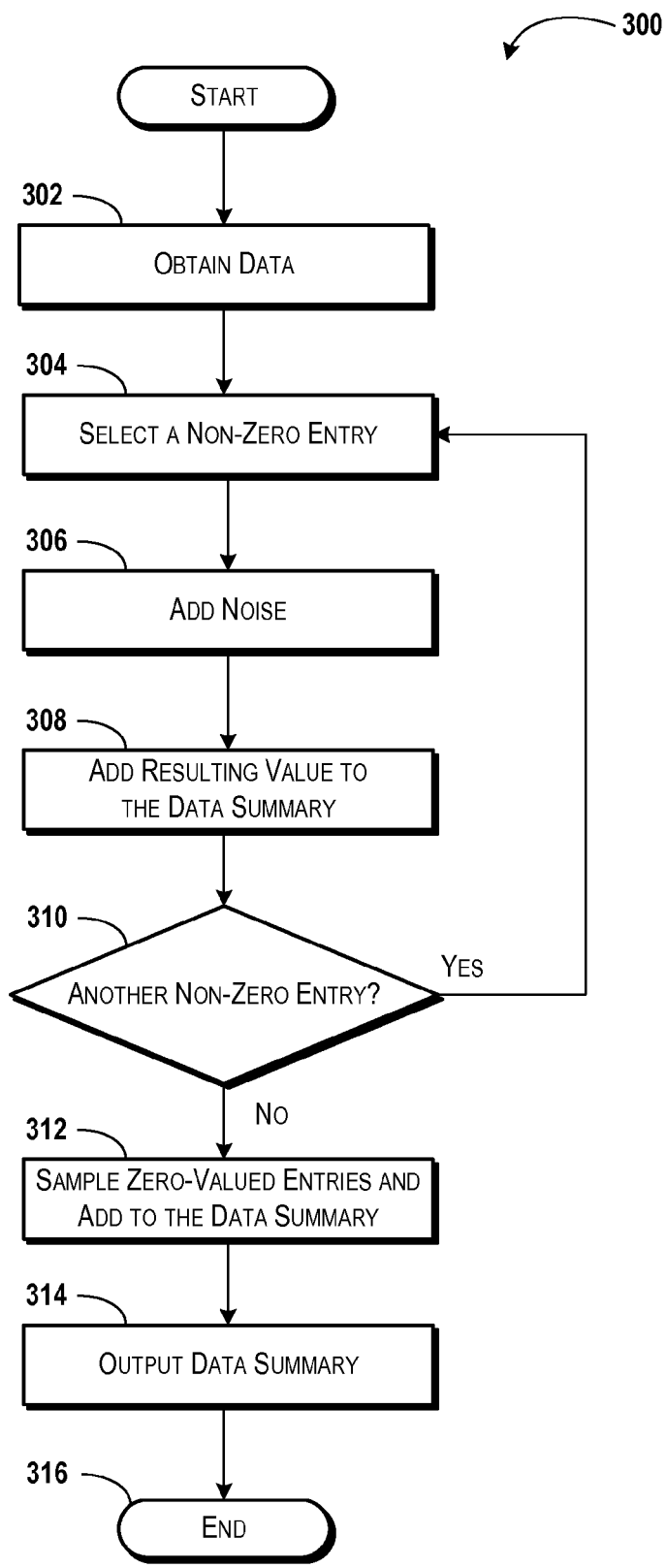
FIG. 3 is a flow diagram showing aspects of a method for efficient publication of sparse data, according to another illustrative embodiment.

Turning now to FIG. 3, aspects of a method 300 for efficient publication of sparse data will be described in detail, according to another illustrative embodiment. The method 300 begins at operation 302, wherein the summarization engine 108 obtains the data 106. It should be understood that operation 302 can be substantially similar to operation 202 described above. As such, the summarization engine 108 can obtain the data 106 from the data storage device 102 or from other devices or nodes. As noted above, the data 106 can be transmitted to, made available to, and/or otherwise provided to the summarization engine 108.

From operation 302, the method 300 proceeds to operation 304, wherein the summarization engine 108 selects a non-zero entry from the data 106. As explained above with reference to operation 204, operation 304 can include identifying each non-zero entry in the data 106 and selection of one of the identified non-zero entries. The non-zero entry selected in operation 304 can be chosen at random and/or selected according to any desired considerations. In some embodiments, for example, the summarization engine 108 selects a first non-zero entry from the data 106 by identifying the non-zero entry from the data 106 having a largest value or a smallest value, by selecting a first non-zero value in the data 106, and/or according to other considerations. It should be understood that these embodiments are illustrative, and should not be construed as being limiting in any way.

From operation 304, the method 300 proceeds to operation 306, wherein the summarization engine 108 adds noise to the selected non-zero entry. As mentioned above, adding noise, also referred to herein and in the claims as modifying the selected value, can include adding a value of 0 to the selected value. Thus, someone observing the data with the noise added will be unaware of whether the value is the real value or the value with noise added. Thus, the operation 306 can include adding 0 to the selected non-zero entry. Again, the summarization engine 108 can add geometric noise to the selected non-zero entry according to one or more functions. The non-zero entry with the added geometric noise is referred to herein as a "resulting value." According to various implementations, the noise added to the selected non-zero entry is selected randomly or non-randomly from a defined range.

From operation 306, the method 300 proceeds to operation 308, wherein the summarization engine 108 adds the resulting value to the data summary 112. According to various embodiments, the resulting value is added to the data summary 112 with a defined probability. In one embodiment, the probability with which the resulting value is added to the data summary 112 is defined as $$p_i = \min\left(\frac{|M'(i)|}{\tau}, 1\right).$$

It should be understood that this embodiment is illustrative, and should not be construed as being limiting in any way.

From operation 308, the method 300 proceeds to operation 310, wherein the summarization engine 108 determines if the data 106 includes another non-zero entry. If the summarization engine 108 determines, in operation 308, that the data 106 includes another non-zero entry, the method 300 returns to operation 304, wherein the summarization engine 108 selects another non-zero entry from the data 106. The operations 304-310 can be repeated until all non-zero entries in the data 106 have been processed by the summarization engine 108 or until the summarization engine 108 proceeds for other reasons. If the summarization engine 108 determines, in operation 310, that another non-zero entry does not exist in the data 106, the method 300 proceeds to operation 312.

At operation 312, the summarization engine 108 samples the zero-valued entries in the data 106 and adds the sampled zero-valued entries to the data summary 112. According to various embodiments, the sampling performed by the summarization engine 108 in operation 312 includes uniformly and randomly selecting k entries i from the data 106 such that the probability with which the entries are selected satisfy a defined probability. In one embodiment, the number k zero entries i are sampled from the data 106, and the value of k, i.e., the number of entries sampled from the data 106, is determined according to a statistical distribution. In some embodiments, the statistical distribution includes the binomial distribution $Bin((m-n),p_\tau)$, where $$p_\tau \triangleq \frac{2\alpha(1-\alpha^\tau)}{\tau(1-\alpha^2)}.$$

It should be understood that this embodiment is illustrative, and should not be construed as being limiting in any way.

From operation 312, the method 300 proceeds to operation 314, wherein the summarization engine 108 outputs the data summary 112. As mentioned above with reference to FIG. 1, the summarization engine 108 is configured to randomly select k entries i from the data 106, and to draw the summary values as calculated in operations 302-312 from the distribution $Pr[X \le v]$ given by $$\tau\alpha^{-v}C_\tau(1-\alpha),$$
$$\text{if } v \le -\tau,$$
$$C_\tau(-v\alpha^{-v} + (v+1)\alpha^{-v+1} - \alpha^{\tau+1}),$$
$$\text{if } -\tau \le v \le 0,$$
$$\frac{1}{2} + \propto C_\tau(1-(v+1)\alpha^v + v\alpha^{v+1}),$$
$$\text{if } 0 \le v \le \tau,$$
$$\text{and}$$
$$\frac{1}{2} + \propto C_\tau(1-\alpha^\tau - \tau\alpha^v(1-\alpha)),$$
$$\text{if } v > \tau.$$

From operation 314, the method 300 proceeds to operation 316. The method 300 ends at operation 316.

While not mentioned explicitly above, it should be understood that either, both, or neither of the methods 200 and 300, noise can be added to the sampled zero entries, as set forth at operations 214 and 312, respectively. Thus, the zero entries can be modified, if desired, in the same manner as explained above with respect to the non-zero entries prior to adding the zero entries to the data summary 112. It should be understood that this embodiment is illustrative, and should not be construed as being limiting in any way.

Figure 4:
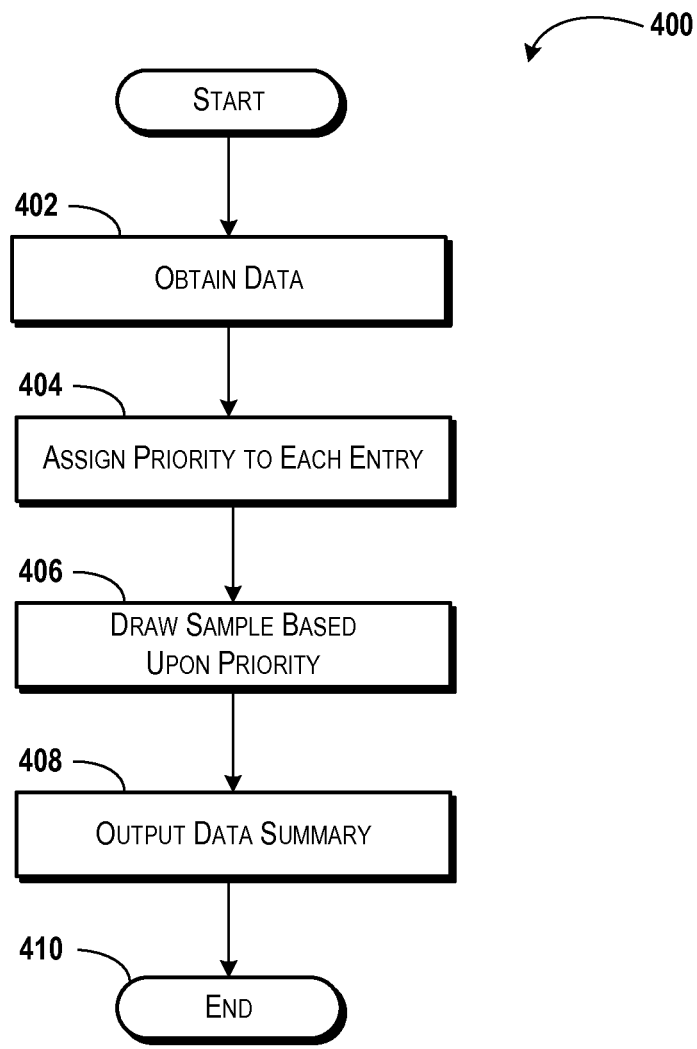
FIG. 4 is a flow diagram showing aspects of a method for efficient publication of sparse data, according to yet another illustrative embodiment.

Turning now to FIG. 4, aspects of a method 400 for efficient publication of sparse data will be described in detail, according to yet another illustrative embodiment. The method 400 begins at operation 402, wherein the summarization engine 108 obtains the data 106. As explained above with reference to operations 202 and 302 of FIGS. 2 and 3, respectively, the summarization engine 108 can obtain the data 106 from the data storage device 102 or from other devices or nodes, and that the data 106 can be transmitted to, made available to, and/or otherwise provided to the summarization engine 108.

From operation 402, the method 400 proceeds to operation 404, wherein the summarization engine 108 assigns a priority value to each entry in the data 106. In some embodiments, the assigned priority value is defined as $$P_i = \frac{|M'(i)|}{r_i},$$

where $r_i$ is a random value chosen uniformly from the range (0,1). It should be understood that this embodiment is illustrative, and should not be construed as being limiting in any way, as the priority values can be defined using other functions or relationships.

From operation 404, the method 400 proceeds to operation 406, wherein the summarization engine 108 draws a sample from the data 106. In various implementations, the summarization engine 108 selects the sample based, at least partially, upon the assigned priority values. The sample drawn in operation 406 can be of size s. In some embodiments, the summarization engine 108 selects the s items by identifying and selecting the entries in the data 106 having the s largest priority values as assigned in operation 404. It should be understood that this embodiment is illustrative, and should not be construed as being limiting in any way. According to another embodiment, the summarization engine 108 also is configured to retain the (s+1) th largest priority value for estimation purposes, though this is not necessarily the case.

From operation 406, the method 400 proceeds to operation 408, wherein the summarization engine 108 outputs the data summary 112. It can be appreciated from the above description that the s entries having the s largest priority values can be added to the data summary 112, though this step is not explicitly illustrated in FIG. 4. As such, operation 408 includes outputting the s entries of the data 106 having the s largest priority values as assigned in operation 404. From operation 408, the method 400 proceeds to operation 410. The method 400 ends at operation 410.

Although not illustrated herein, some embodiments of the concepts and technologies disclosed herein include using a combination of sampling and filtering. In particular, in some embodiments, filtering is used to remove small counts from the data 106. This filtering is based upon an assumption that small counts result from the geometric noise added to zero-valued entries, and not from real inputs. Thus, the small counts in the data 106 are assumed to be noise-based counts and therefore can be removed. According to various embodiments of the concepts and technologies disclosed herein, if the threshold is set too low for the filtering, some of the small counts resulting from the noise will be removed, but many such counts may pass the filter. Similarly, if the threshold is set too high, many real counts will be removed in addition to the noise-based counts.

In some embodiments, therefore, a combination of filtering and sampling is used. Thus, low frequency entries are filtered out of the data 106, and then a sample is drawn from the remaining entries in the data 106. In some embodiments, this filtering and sampling approach provides removal of noise and bounded output size, thereby improving the results of the application.

Figure 5:
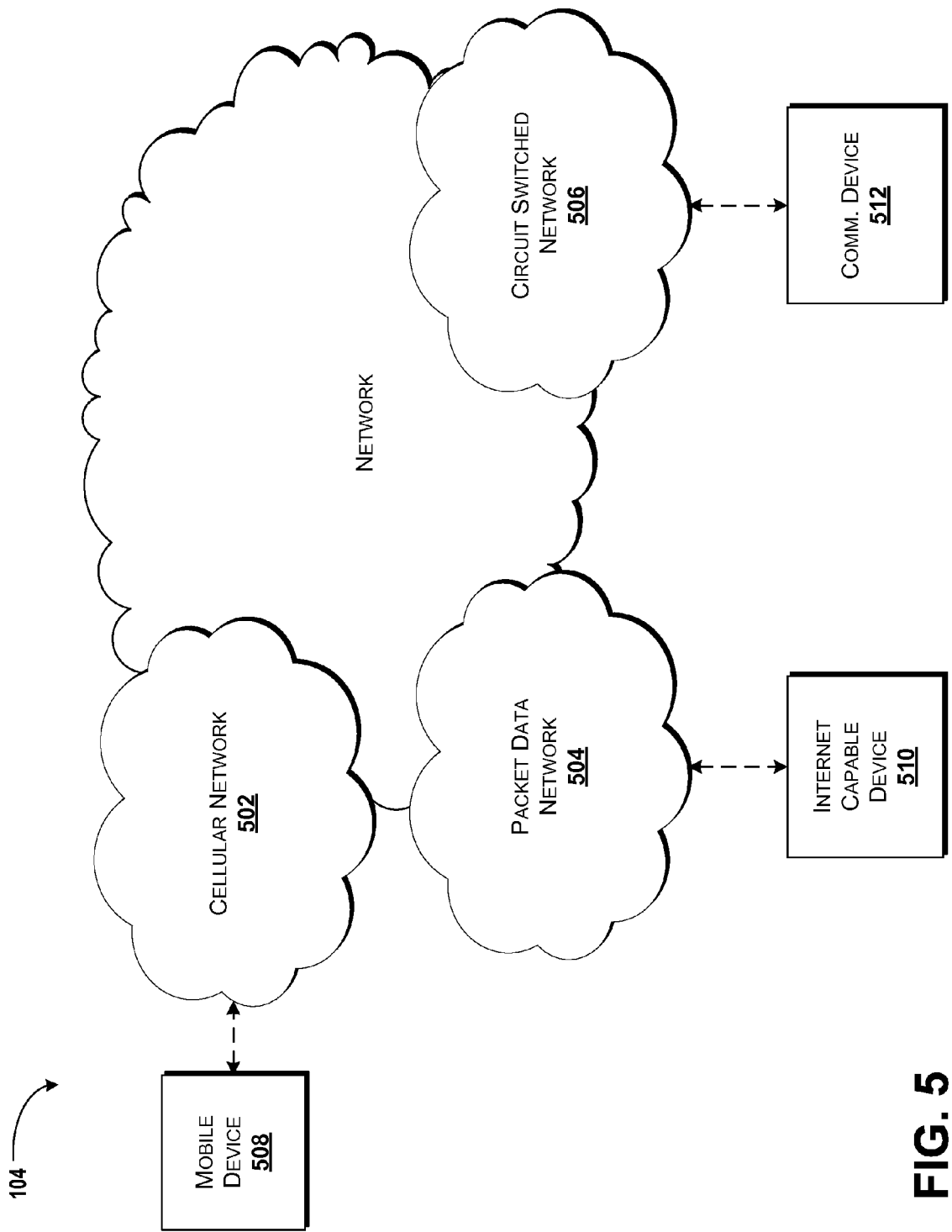
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
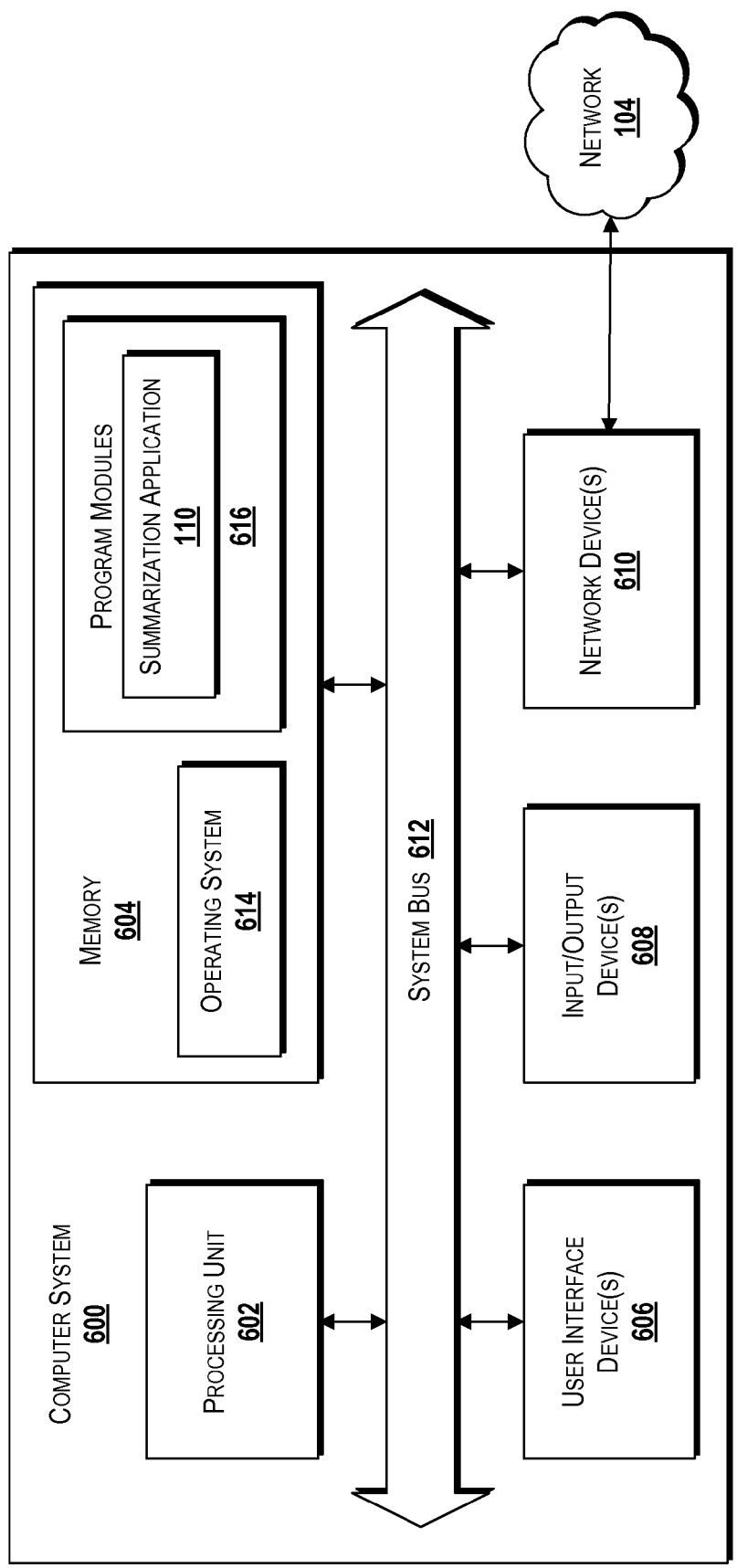
FIG. 6 is a block diagram illustrating an example computer system configured to enable differentially private publication of sparse data, according to some illustrative embodiments.

FIG. 6 is a block diagram illustrating a computer system 600 configured to verify transactions using user devices, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like. The program modules 616 may further include the summarization application 110. In some embodiments, the summarization application 110 is embodied in computer-readable media containing instructions that, when executed by the processing unit 602, perform one or more of the methods 200, 300, 400 for efficient publication of sparse data, as described in detail above with respect to FIGS. 2-4. According to embodiments, the program modules 616 may be embodied in hardware, software, firmware, or any combination thereof.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof, does not include waves, signals, and/or other transitory and/or intangible communication media, per se.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for efficient publication of sparse data have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

We claim:

1. A method comprising:
   obtaining, at a computer executing a summarization engine, sparse data comprising a plurality of entries, wherein a majority of the plurality of entries comprise zero-valued entries, and wherein a minority of the plurality of entries comprise non-zero valued entries;
   modifying, by the computer, one of the non-zero valued entries to obtain a resulting value;
   determining, by the computer, that the resulting value satisfies a threshold;
   in response to determining that the resulting value satisfies the threshold, adding, by the computer, the resulting value to a data summary;
   sampling, by the computer, one of the zero-valued entries;
   adding, by the computer, the one of the zero-valued entries to the data summary; and
   publishing, by the computer, the data summary, wherein the data summary comprises an anonymized summary of the sparse data.

2. The method of claim 1, wherein sampling the one of the zero-valued entries comprises sampling a number of zero-valued entries, wherein the number is determined according to a statistical distribution.

3. The method of claim 1, wherein modifying the one of the plurality of entries comprises adding noise to the one of the plurality of entries.

4. The method of claim 1, wherein modifying the one of the plurality of entries comprises adding a value of zero to the one of the plurality of entries.

5. The method of claim 1, further comprising;
   in response to determining that the resulting value does not satisfy the threshold, not adding the resulting value to the data summary.

6. The method of claim 1, further comprising:
   selecting a second of the non-zero valued entries;
   modifying the second of the non-zero valued entries to obtain a second resulting value; and
   adding the second resulting value to the data summary.

7. The method of claim 1, wherein the data summary comprises a data summary that is differentially private.

8. The method of claim 1, wherein modifying the one of the non-zero valued entries comprises modifying each of the non-zero valued entries to obtain a plurality of resulting values, and wherein adding the resulting value to the data summary comprises adding each of the plurality of resulting values that satisfies the threshold to the data summary.

9. The method of claim 1, wherein over ninety-five percent of the plurality of entries comprise the zero-valued entries.

10. The method of claim 1, wherein modifying the one of the non-zero valued entries comprises adding geometric noise to the one of the non-zero valued entries.

11. A method comprising:
    obtaining, by a computer executing a summarization engine, sparse data comprising a plurality of entries, wherein over half of the plurality of entries comprise zero-valued entries, and wherein less than half of the plurality of entries comprise non-zero valued entries;
    modifying, by the computer, one of the non-zero valued entries to obtain a resulting value;
    adding, by the computer, the resulting value to a data summary;
    sampling, by the computer, one of the zero-valued entries;
    adding, by the computer, the one of the zero-valued entries to the data summary; and
    publishing, by the computer, the data summary.

12. The method of claim 11, further comprising sampling a number of the zero-valued entries comprising the one of the zero-valued entries, wherein the number is determined according to a statistical distribution.

13. The method of claim 12, wherein modifying the one of the non-zero valued entries comprises drawing a sample from non-zero valued entries and adding noise to the sample from the non-zero valued entries.

14. The method of claim 11, wherein modifying the one of the non-zero valued entries comprises adding noise to the one of the non-zero valued entries.

15. The method of claim 11, wherein the data summary comprises a data summary that is differentially private.

16. The method of claim 11, wherein modifying the one of the non-zero valued entries comprises adding geometric noise to the one of the non-zero valued entries.

17. A method comprising:
   obtaining, by a computer executing a summarization engine, sparse data comprising a plurality of entries, wherein a majority of the plurality of entries comprise zero-valued entries, and wherein a minority of the plurality of entries comprise non-zero valued entries;
   assigning, by the computer, a priority value to each of the plurality of entries;
   drawing, by the computer, a sample from the plurality of entries, the sample comprising a plurality of sampled entries;
   adding, by the computer, the plurality of sampled entries to a data summary; and
   publishing, by the computer, the data summary, wherein the data summary comprises an anonymized summary of the sparse data.

18. The method of claim 17, further comprising identifying a sample size, wherein a number of the plurality of sampled entries is equal to the sample size.

19. The method of claim 18, wherein drawing the sample comprises selecting the plurality of entries by recursively removing from the plurality of entries, and adding to the data summary, an entry having a highest value.

20. The method of claim 17, wherein the data summary comprises a data summary that is differentially private.

\* \* \* \* \*